(12) United States Patent
Ohkawa

(10) Patent No.: US 6,956,217 B2
(45) Date of Patent: Oct. 18, 2005

(54) MASS SEPARATOR WITH CONTROLLED INPUT

(75) Inventor: Tihiro Ohkawa, La Jolla, CA (US)

(73) Assignee: Archimedes Operating, LLC, San Diego, CA (US)

( * ) Notice: Subject to any disclaimer, the term of this patent is extended or adjusted under 35 U.S.C. 154(b) by 80 days.

(21) Appl. No.: 10/775,271

(22) Filed: Feb. 10, 2004

(65) Prior Publication Data

US 2005/0173630 A1    Aug. 11, 2005

(51) Int. Cl.$^7$ ................................................ G21F 9/00
(52) U.S. Cl. ................. 250/396; 210/223; 210/695; 210/748; 209/12.1; 96/2; 96/3; 96/28
(58) Field of Search ................ 250/396; 210/223, 210/695, 748; 209/12.1; 588/10; 96/2, 3; 95/28

(56) References Cited

U.S. PATENT DOCUMENTS

| | | | |
|---|---|---|---|
| 3,722,677 A | 3/1973 | Lehnert | |
| 5,039,312 A | 8/1991 | Hollis, Jr. et al. | |
| 5,225,740 A | 7/1993 | Ohkawa | |
| 5,422,481 A | 6/1995 | Louvet | |
| 5,681,434 A | 10/1997 | Eastlund | |
| 5,868,909 A | 2/1999 | Eastlund | |
| 5,939,029 A | 8/1999 | Ohkawa | |
| 6,096,220 A | 8/2000 | Ohkawa | |
| 6,214,223 B1 | 4/2001 | Ohkawa | |
| 6,251,281 B1 | 6/2001 | Ohkawa | |
| 6,251,282 B1 | 6/2001 | Putvinski et al. | |
| 6,258,216 B1 | 7/2001 | Ohkawa | |
| 2004/0077916 A1 * | 4/2004 | Gilleland et al. | 588/10 |

* cited by examiner

*Primary Examiner*—Nikita Wells
*Assistant Examiner*—James J. Leybourne
(74) *Attorney, Agent, or Firm*—Nydegger & Associates

(57) ABSTRACT

A device for separating particles according to their respective masses includes a substantially cylindrical wall of inner radius, "$R_{wall}$", that surrounds a chamber and defines a longitudinal axis. A multi-species plasma having relatively cold ions is initiated at a first end of the chamber within a relatively small radius, "$r_{source}$", from the longitudinal axis. A hollow cylinder having an outer radius, "$R_{outer}$", is positioned at the second end of the chamber and centered on the axis. Cross electric and magnetic fields (E×B) are established in the chamber that are configured to send ions of relatively high mass on trajectories having a radial apogee, $r_{apogee}$, that is greater than the cylinder's outer radius ($r > R_{outer}$). After reaching apogee, these ions lose energy and strike the cylinder where they are collected. Low mass ions are placed on small radius helical trajectories and pass through the hollow cylinder.

20 Claims, 1 Drawing Sheet

MASS SEPARATOR WITH CONTROLLED INPUT

FIELD OF THE INVENTION

The present invention pertains generally to devices and methods for separating the constituents of a multi-constituent material. More particularly, the present invention pertains to separation devices that convert a multi-constituent material into a plasma and thereafter separate particles in the plasma according to their respective mass to charge ratios. The present invention is particularly, but not exclusively, useful for separating particles, such as isotopes, that have relatively close mass to charge ratios.

BACKGROUND OF THE INVENTION

By definition, atoms of a given chemical element have the same atomic number. However, atoms of a chemical element may have different mass numbers. Specifically, different isotopes of a chemical element will have the same number of protons, but a different number of neutrons, in their respective nuclei. As one might expect, the separation of one isotope from another using chemical techniques is somewhat difficult because different isotopes of the same chemical element typically have almost identical chemical properties. On the other hand, techniques such as gravimetric and centrifugal separation processes that rely on a weight differential for separation are generally inefficient for isotope separation because of the relatively small weight differential that exists between isotopes of the same chemical element.

Particularly relevant for the present discussion is the fact that a plasma can be created from a material that contains isotopes of a chemical element. In greater detail, a plasma is a high-temperature, highly ionized, gaseous discharge that typically includes electrons, ions, and electrically neutral particles. Although the various particles in a plasma may be positively or negatively charged, the relative number of negative charges (e.g. electrons and negative ions) and positive ions that exist in a plasma are such that the plasma, as a whole, is electrically neutral. Nonetheless, a plasma is typically so highly ionized that it is electrically conductive and can be influenced by electric and magnetic fields.

One separation technique that has been previously suggested takes advantage of the fact that the orbital motions of charged particles (e.g. ions) in a plasma under the influence of crossed electric and magnetic fields will differ from each other according to their respective mass to charge ratios. For example, U.S. Pat. No. 6,096,220, which issued on Aug. 1, 2000 to Ohkawa, for an invention entitled "Plasma Mass Filter" and which is assigned to the same assignee as the present invention, discloses a device which relies on the different, predictable, orbital motions of charged particles in crossed electric and magnetic fields to separate charged particles from each other according to their respective mass to charge ratios. U.S. Pat. No. 6,096,220 is hereby incorporated by reference.

In the filter disclosed in Ohkawa '220, a cylindrical shaped wall surrounds a chamber and defines a longitudinal axis for the filter. Coils are provided to establish an axially oriented magnetic field throughout the chamber. The filter also includes electrodes for generating an electric field in the chamber that is oriented substantially radially and outwardly from the axis (e.g. a parabolic electric field having a positive potential on the axis relative to the wall which is typically at a zero potential). With this cooperation of structure, both the magnetic and the electric fields are substantially uniform both azimuthally and axially.

As further disclosed in Ohkawa '220, this configuration of applied electric and magnetic fields causes ions having relatively low mass to charge ratios (hereinafter referred to as low mass ions) to be confined inside the chamber during their transit of the chamber. On the other hand, ions having relatively high mass to charge ratios (hereinafter referred to as high mass ions) are not so confined. Instead, these high mass ions are ejected from the plasma and into the wall of the chamber (or a collector positioned near the wall) before completing their transit through the chamber. The demarcation between high mass particles and low mass particles is a cut-off mass, $M_C$, which is established by setting the magnitude of the magnetic field strength, $B_z$, the positive voltage along the longitudinal axis, $V_{ctr}$, and the distance from the axis to the wall, "$a_{wall}$". The cut-off mass, $M_C$, can then be determined with the expression:

$$M_C = z e a_{wall}^2 (B_z)^2 / 8 V_{ctr}$$

where "ze" is the ion charge.

The Ohkawa '220 patent further discloses an operating procedure for the plasma mass filter in which a plasma throughput, $\Gamma$, is established such that the plasma density remains below a defined collisional density, $n_c$. More specifically, as used herein, the "collisional density," $n_c$, is defined as being a plasma density wherein there is a probability of "one" that an ion collision will occur within a single orbital rotation of an ion around a rotation axis parallel to the chamber axis under the influence of crossed electric and magnetic fields ($E_r \times B_z$). In other words, a collisional density, $n_c$, is established when it is just as likely that an ion will collide with another ion, as it is that the ion will not collide with another ion during a single orbital rotation.

In order to improve the plasma throughput, $\Gamma$, of a plasma filter, however, it may be desirable to operate the filter with plasma densities above the collisional density, $n_c$. Along these lines, a system for separating ions by mass that is operable at plasma densities above the collisional density, $n_c$, is disclosed and claimed in co-pending U.S. patent application Ser. No. 10/222,475 entitled "High Throughput Plasma Mass Filter" filed on Aug. 16, 2002 by Tihiro Ohkawa, and which is assigned to the same assignee as the present invention. U.S. patent application Ser. No. 10/222,475 is hereby incorporated by reference. For such a system that operates above the collisional density, nc, the separation factor, F, can be estimated using the relationship:

$$F = \omega^2 r^2 \Delta M / 2 k_0 T$$

where $\omega$ is angular speed, r is radius, $k_0$ is Boltzmann constant, T is temperature (Kelvin) and $\Delta M$ is the difference in mass between the low mass ions and the high mass ions. Thus, for operation above the collisional density, $n_c$, good separation factors can be obtained when the ion thermal energy is much less that the ion rotational energy.

In the absence of any specific provisions to control ion energy, ions are typically born during plasma initiation with an initial ion temperature that is relatively high (e.g. 500–700 eV). The downside of this relatively high initial ion energy is two-fold. First, as indicated above, the high initial ion energy adversely affects the separation factor for systems operating above the collisional density, $n_c$. This is particularly concerning when the ions to be separated have a small mass differential, $\Delta M$, for example when the ions to be separated are isotopes of the same chemical element, since the separation factor, F, is proportional to the mass differential, $\Delta M$.

Another drawback associated with relatively high energy ions in a plasma is the heat that is transferred to the ion collector. In greater detail, when an ion strikes a collector, the full rotational energy of the ion is transferred to the collector in the form of heat. In general, collectors are only operational over a limited temperature range, and accordingly, a collector can only accommodate a limited amount of heat. In some cases, this restriction on collector heating can limit the operational throughput of the filter (i.e. throughput is limited to levels in which collector overheating does not occur). It follows that reduced energy ions can be used at higher throughputs, without collector overheat.

For the arrangement of fields described above, cold ions can be formed using a controlled plasma source that initiates a plasma within a relatively small radius of the longitudinal axis. Specifically, consider an ion rotating in the uniform field region. The orbit is circular and $v_r=0$. The force balance dictates:

$$\omega=[\tfrac{1}{2}][-\Omega\pm\{\Omega^2-4\alpha\Omega\}^{1/2}]$$

where $\Omega=eB_0/M$ is the cyclotron frequency. The canonical angular momentum is given by:

$$\rho_\theta=\pm[eB_zr^2/2][1-4\alpha/\Omega]^{1/2}.$$

The ions with its mass equal to the cut-off mass have zero canonical momentum. The potential energy U of the Hamiltonian in the uniform field region is:

$$U=e^2B_z^2r^2/8M-\alpha eB_zr^2/2.$$

For ions with the cut-off mass, $M_C$, the potential becomes:

$$U=0$$

When ions are produced by the ionization of neutral atoms, they have negligible kinetic energy. If they are produced at the location with $U=0$ and $\Psi=0$, the ions can form a cold rotating ring, provided that two regions are connected by the orbits. For example, the ions may be produced on the axis.

In light of the above, it is an object of the present invention to provide separation devices for converting a multi-constituent material into a plasma and thereafter separating particles in the plasma according to their respective mass to charge ratios. It is another object of the present invention to provide a mass separator that is operable at both collisional and collision-less plasma densities. It is still another object of the present invention to provide a mass separator that can be used to efficiently separate particles having a relatively small mass differential (e.g. isotopes of the same chemical element). It is yet another object of the present invention to provide a device for separating ions which can be used at relatively high throughputs without overheating the ion collectors. Yet another object of the present invention is to provide a separation device which is easy to use, relatively simple to implement, and comparatively cost effective.

SUMMARY OF THE INVENTION

The present invention is directed to a device for separating the constituents of a multi-constituent material, such as a material that contains more than one isotope of a given chemical element. The device includes a substantially cylindrical wall of inner radius, "$R_{wall}$", that surrounds a chamber and defines a longitudinal axis. An injector is positioned at one end (e.g. a first end) of the chamber and oriented to introduce the multi-constituent material into the chamber. A mechanism such as an antenna is provided to convert the multi-constituent material into a multi-species plasma in the chamber within a relatively small radius, "$r_{source}$", from the longitudinal axis. The result is a plasma source having a radius, "$r_{source}$", from the longitudinal axis that creates ions having relatively low thermal energies (i.e. cold ions). Specifically, cold ions of relatively low mass to charge ratio, $M_1$, and cold ions of relatively high mass to charge ratio, $M_2$, are created by the small radius plasma source.

The separation device further includes a heavy ion collector that is shaped as a hollow cylinder having an inner radius, "$R_{inner}$", and an outer radius, "$R_{outer}$". The cylindrical collector is positioned at the second end of the chamber and centered on the longitudinal axis. One or more coils are mounted on the outside of the wall to generate an axially aligned magnetic field, $B_z$, throughout the chamber. Also, the device includes a plurality of electrodes which are typically mounted at one end of the chamber (in some cases electrodes are mounted at both ends). These electrodes are provided to generate a, preferably, parabolic electric field, $E_r$, that is directed radially outward, and accordingly, the electric field is oriented substantially perpendicular to the magnetic field. In greater detail, the electrodes establish a positive potential, $V_{ctr}$, along the longitudinal axis and a substantially zero potential at a radial distance, "a", from the longitudinal axis, where the distance, "a", is less than the inner radius, "$R_{wall}$" of the wall ("a"<"$R_{wall}$").

For the separation device, the strength of the applied fields (i.e. $E_r$ and $B_z$) are set to establish a cutoff mass, $M_C$, for a plasma region of radius "a" in accordance with the equation:

$$M_C=zea^2(B_z)^2/8V_{ctr}$$

where "ze" is the ion charge. With this cutoff mass, $M_C$, ions having a mass greater than $M_C$ will be ejected from the plasma region while ions having a mass less than $M_C$ will be confined within the plasma region. However, for the present invention, the cutoff mass, $M_C$, is established to be greater than or equal to the mass of the high mass ions and greater than the mass of the low mass ions (i.e. $M_1<M_2\leq M_C$). With this cooperation of structure, the high mass ions, $M_2$, are placed on trajectories having a radial apogee, $r_{apogee}$, from the axis that is greater than the collector's outer radius ($r_{apogee}>R_{outer}$). Thus, the high mass ions, $M_2$, travel from the plasma source on trajectories until they reach a distance, $r_{apogee}$, from the axis. At the radial apogee, $r_{apogee}$, the high mass ions "turn back" toward the axis and strike the cylindrical heavy ion collector. As the high mass ions move from apogee toward the collector, the ions lose energy and have only modest energy (i.e. compared to an ion at apogee) when they strike the collector. Accordingly, the amount of heat each ion transfers to the collector is relatively small. Unlike the high mass ions, the low mass ions, $M_1$, are placed on helical trajectories having a trajectory diameter, $D_{low\ mass}$, that is less than the inner diameter, $2R_{inner}$, of the hollow collector. As such, these low mass ions pass through the hollow portion of the heavy ion collector. Typically, the collector is sized with $R_{inner}>D_{low\ mass}+r_{source}$ to ensure that a low mass ion born at a distance, $r_{source}$, from the axis will pass through the hollow collector. A light ion collector can be positioned to receive and collect the low mass ions that pass through the heavy ion collector.

The separator is operable in either the collisional or collision-less regimes. In the collision-less regime, the relatively small radius of the plasma source, $r_{source}$, ensures that all low mass ions pass through the hollow collector. Additionally, high mass ions are not ejected from the plasma region because the mass of the high mass ions, $M_2$, is less than the cutoff mass, $M_C$. This is beneficial because the loss of charged, high mass particles from the plasma can upset the electrical potential which typically must be balanced for efficient separation to occur. On the other hand, when the device is used in the collisional regime, the relatively small radius of the plasma source, $r_{source}$, ensures that the ions are born cold. This results in an improved separation factor, F, allowing the separation device to be used to separate particles, such as isotopes, that have relatively close mass to charge ratios.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
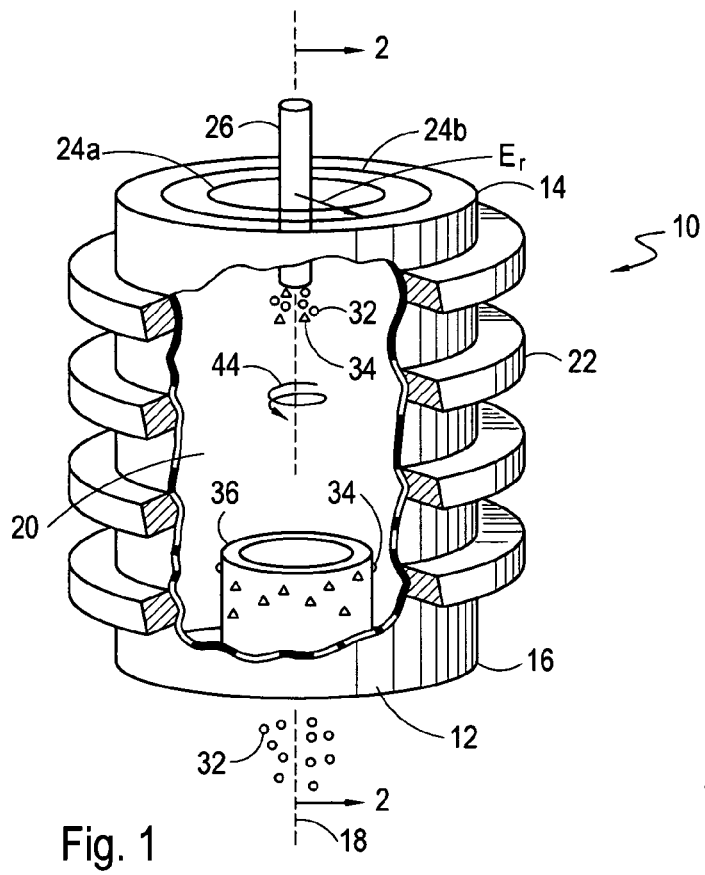
FIG. 1 is a simplified perspective view of a mass separator shown with portions of the separator wall removed to more clearly show the cylindrical ion collector and the plasma source.

Referring initially to FIG. 1, a mass separator for separating the constituents of a multi-constituent material, such as a material that contains more than one isotope of a given chemical element is shown and generally designated 10. As shown, the separator 10 includes an enclosing wall 12 that extends from a first end 14 to a second end 16. As further shown, the wall 12 is typically formed as an elongated cylinder of inner radius, "$R_{wall}$", that is centered on a longitudinal axis 18. It is further shown that the wall 12 surrounds a cylindrical chamber 20.

Referring still to FIG. 1, it can be seen that a plurality of coils 22, in this case four coils 22, are positioned on the outside of wall 12 to generate a uniform magnetic field, $B_z$, (field direction shown in FIG. 2) throughout the chamber 20. In a typical embodiment of the separator 10, the magnetic field, $B_z$, is substantially uniform both azimuthally and axially, and is directed substantially parallel to the longitudinal axis 18. It is to be appreciated that the size, shape, number and type of coil shown in FIG. 1 is merely exemplary and that any devices and methods known in the pertinent art for establishing a uniform magnetic field in a chamber, such as the chamber 20, can be substituted in place of the coils 22 for use in the separator 10.

Figure 2:
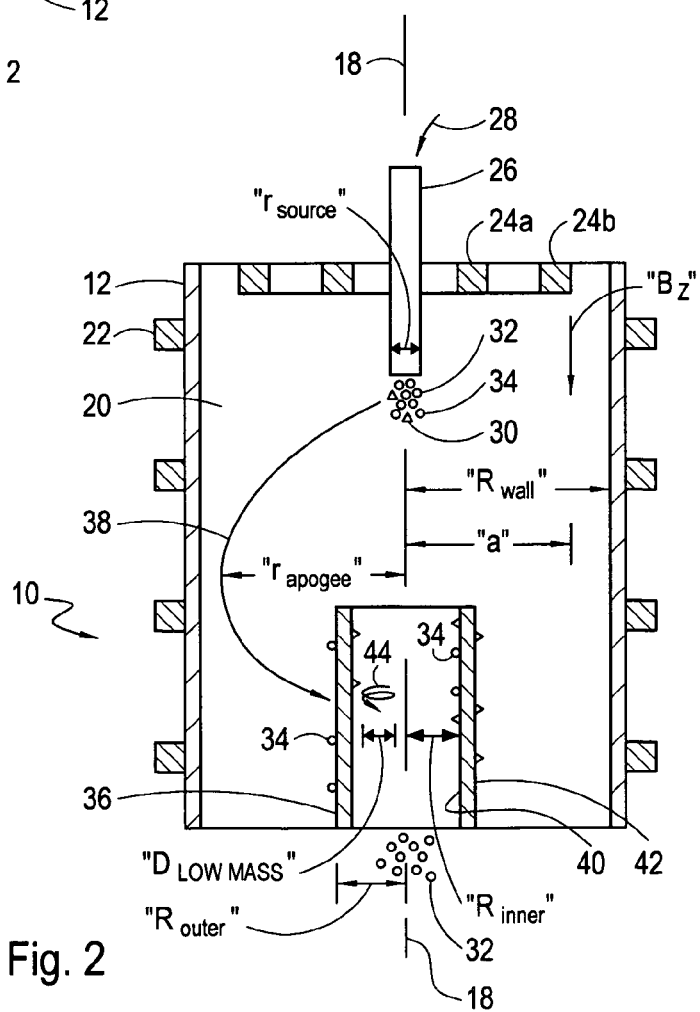
FIG. 2 is a cross-sectional view of the filter shown in FIG. 1 as seen along line 2—2 in FIG. 1.

Continuing with FIG. 1, it can be seen that the separator 10 includes ring electrodes 24a,b for creating an electric field, $E_r$, that is radially oriented within the chamber 20. Also shown in FIGS. 1 and 2, ring electrodes 24a,b can be circular rings that are concentrically arranged and centered on the longitudinal axis 18. As further shown, the electrodes 24a,b are positioned at the end 14 of the wall 12. Another electrode 24 (not shown) can be positioned on the axis 18 at the second end 16 of the wall 12. With this cooperation of structure, the electrodes 24a,b establish a positive voltage ($V_{ctr}$) along the longitudinal axis 18 and a substantially zero potential at a radial distance "a" (shown in FIG. 2) from the longitudinal axis 18. As shown in FIG. 2, the electrodes 24a,b are configured such that the radial distance, "a" is less than the inner radius, "$R_{wall}$" of the wall 12 ("a"<"$R_{wall}$").

Cross referencing FIGS. 1 and 2, it can be seen that the separator 10 includes a plasma source 26 that is positioned at the first end 14 and centered on the longitudinal axis 18. Functionally, the plasma source 26 converts the multi-constituent material (which is input into the plasma source 26 along arrow 28) into a multi-species plasma 30. In greater detail, the multi-species plasma 30 is created in the chamber 20 within a relatively small radius, "$r_{source}$", from the longitudinal axis 18. In one implementation, the plasma source 26 includes an injector for delivering the multi-constituent material to the chamber 20 and an antenna to convert the multi-constituent material into the multi-species plasma 30 in the chamber 20. Because the multi-species plasma 30 is initiated within a relatively small radius, "$r_{source}$" from the longitudinal axis 18, ions are created in the multi-species plasma 30 having relatively low thermal energies (e.g. cold ions having energies in the range of 0.1 eV–1.0 eV). Specifically, cold ions of relatively low mass to charge ratio, $M_1$, (i.e. low mass ions 32) and cold ions of relatively high mass to charge ratio, $M_2$ (i.e. high mass ions 34) are created by the small radius plasma source 26. As contemplated for the separator 10, the multi-constituent material can be any of a wide variety of mixtures to include: a chemical mixture, a mixture of isotopes, a mixture containing matter that is highly radioactive or any other mixture for which separation is desirable. Continuing with cross-reference to FIGS. 1 and 2, it can be seen that the separator 10 further includes a heavy ion collector 36 that is shaped as a hollow cylinder having an inner radius, "$R_{inner}$", and an outer radius, "$R_{outer}$". The cylindrical collector 36 is positioned in the chamber 20 at the second end 16 of the wall 12 and centered on the longitudinal axis 18.

OPERATION

The operation of the separator 10 can best be appreciated with reference to FIG. 2. In operation, the strength of the applied fields (i.e. $E_r$ and $B_z$) are set to establish a cutoff mass, $M_C$, for a plasma region of radius "a" in accordance with the equation:

$$M_C = zea^2(B_z)^2/8V_{ctr}$$

where "ze" is the ion charge. In some implementations, a small mirror magnetic field is established near the plasma source 26 to control the axial motion of the ions 32, 34. With the cutoff mass, $M_C$, ions having a mass greater than $M_C$ will be ejected from the plasma region while ions having a mass less than $M_C$ will be confined within the plasma region. However, for the separator 10, the cutoff mass, $M_C$, is established to be greater than or equal to the mass of the high mass ions 34 and greater than the mass of the low mass ions 32 (i.e. $M_1 < M_2 \leq M_C$).

With the above-described cooperation of structure, the high mass ions 34 are placed on trajectories, such as exemplary trajectory 38. The trajectory 38 typically has radial, azimuthal and axial components and is typically somewhat helical in shape. As shown in FIG. 2, the high mass ions 34 travel from the plasma source 26 on trajectories, such as exemplary trajectory 38, until they reach a distance, $r_{apogee}$, from the axis 18. At the radial apogee, $r_{apogee}$, the high mass ions 34 "turn back" toward the axis 18 and strike the cylindrical collector 36. Note, the high mass ions 34 can strike the inner surface 40 or outer surface 42 of the collector 36. As the high mass ions 34 move from apogee toward the collector 36, the high mass ions 34 lose energy and have only modest energy (when compared to a high mass ion 34 at apogee) when they strike the collector 36. Accordingly, the amount of heat each high mass ion 34 transfers to the collector 36 is relatively small.

Trajectory parameters and energies of the high mass ions 34 can be estimated as follows:

The potential U for the radial motion of a single particle is given by:

$$U = \lambda r_0^2 [r_0^2/r^2 + \mu r^2/r_0^2] \quad r \leq a \qquad \text{Eq. 1}$$

$$U = \lambda [r_0^4/r^2 + r^2 + \{\mu-1\}a^2] \quad r \geq a \qquad \text{Eq. 2}$$

where $r_0$ is the starting point at zero velocity and $$\lambda = e^2 B^2 / 8M_2$$

$$\mu = 1 - M_2/M_C.$$

The kinetic energy in the perpendicular direction $W_\perp$ is given by:

$$W_\perp = \lambda r_0^2 [1 - \sqrt{\mu}]^2. \qquad \text{Eq. 3}$$

The rotational energy $W_\omega$ is:

$$W_\omega = \lambda r^2 [1 - \sqrt{\mu}]^2. \qquad \text{Eq. 4}$$

Since the starting points are in $0 \leq r_0 \leq r_s$, the average perpendicular energy $<W\perp>$ is given by:

$$<W_\perp> = \lambda [1 - \sqrt{\mu}]^2 r_s^2 / 2 \qquad \text{Eq. 5}$$

and the temperature $T_\perp$ is:

$$T_\perp \sim \lambda [1 - \sqrt{\mu}]^2 r_s^2 / 4. \qquad \text{Eq. 6}$$

For example, if $M_2 = M_C$, then:

$$\mu = 0. \qquad \text{Eq. 7}$$

The high mass ions, $M_2$, are accelerated near the source and proceed at almost constant radial velocity until they reach the radius, a. Upon encountering the reflecting potential given by Eq. 2, they turn back inward. At the collector 36, they are intercepted either by the outer surface 42 or the inner surface 40 of the hollow cylindrical collector 36.

The radial velocity is almost constant away from the plasma source 26 and the density distribution is roughly 1/r. Therefore, the outer surface 42 collects a fraction $[a-r_{outer}]/a$ and the inner surface 40 a fraction $r_{inner}/a$. The rotational kinetic energy $W_{\omega c}$ at which they strike the surface is given by:

$$W_{\omega c} = \lambda r_{outer}^2 = W_\omega [r=a] r_{outer}^2 / a^2. \qquad \text{Eq. 8}$$

Thus, the energy is considerably smaller than the maximum rotational energy and relieves the heat load on the collector 36.

The maximum turning radius, $r_1^*$, for the orbits of the low mass ions 32 is given by:

$$r_1^{*2} = r_s^2 / \mu^* \qquad \text{Eq. 9}$$

where $\mu^* = 1 - M_1/M_C$.

Unlike the high mass ions 34, the low mass ions 32 are placed on axially aligned helical trajectories, such as exemplary trajectory 44, having a trajectory diameter, $D_{low\ mass}$, that is smaller than $2r_{apogee}$.

As indicated above, the shapes of the trajectories 38, 44 can be estimated for various chemical species that are known to be present in the multi-species plasma 30 requiring separation. These estimated trajectory shapes can then be used to design the dimensions of a suitable collector 36. In greater detail, the collector 36 is designed to ensure that the low mass ions 32 pass through the hollow portion of the heavy ion collector 36. Specifically, the heavy ion collector 36 is sized with $R_{inner} > D_{low\ mass} + r_{source}$ to ensure that all low mass ions 32 pass through the hollow collector 36. A light ion collector (not shown) can be positioned to receive and collect the low mass ions 32 that pass through the heavy ion collector 36. In addition, the shape of the trajectory 38 can be estimated and used to size the collector 36 to ensure that all high mass ions 34 strike the heavy ion collector 36. Specifically, the collector 36 is sized wherein the radial apogee, $r_{apogee}$, for the high mass ions 34 is greater than the outer radius of the collector 36 ($r_{apogee} > R_{outer}$).

The separator 10 is operable in either the collisional or collision-less regimes. In the collision-less regime (i.e. at plasma densities less than nc in a plasma region of radius "a" from the axis 18) the relatively small radius of the plasma source, $r_{source}$, ensures that all low mass ions 32 pass through the hollow collector 36. Additionally, high mass ions 34 are not ejected from the plasma region because the mass of the high mass ions 34 is less than the cutoff mass, $M_C$. This is beneficial because the loss of charged, high mass ions 34 from the plasma 30 can upset the electrical potential which typically must be balanced for efficient separation to occur. In the collisional regime (i.e. at plasma densities equal to and above, $n_c$, in a plasma region of radius "a" from the axis 18) the relatively small radius of the plasma source, $r_{source}$, ensures that the ions are born cold. This results in an improved separation factor, F, allowing the separation device 10 to be used to separate particles, such as isotopes, that have relatively close mass to charge ratios.

While the particular Mass Separator with Controlled Input as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for separating a multi-constituent material into constituents, said device comprising:
   a cylindrical wall having a first end, a second end and an inner radius, $R_{wall}$, said wall surrounding a chamber and defining a longitudinal axis;
   means at said first end of said wall for converting the multi-constituent material into a multi-species plasma in said chamber within a radius, $r_{source}$, from said longitudinal axis to create cold ions of relatively low mass to charge ratio, $M_1$, and cold ions of relatively high mass to charge ratio, $M_2$;
   a collector shaped as a hollow cylinder having outer radius $R_{outer}$, said collector centered on said longitudinal axis and positioned at said second end of said wall;
   means for establishing crossed electric and magnetic fields (E×B) in said chamber to define a cutoff mass $M_C$, relative to a radial distance, a, from said axis, with $M_1 < M_2 \leq M_C$ and $a < R_{wall}$; and
   means for controlling E×B to place said ions of relatively high mass to charge ratio, $M_2$, on trajectories having a radial apogee, $r_{apogee}$, into said collector with $r_{apogee}>R_{outer}$, and to place said ions of relatively low mass to charge ratio, $M_1$, on trajectories through said hollow collector.

2. A separator as recited in claim 1 wherein said controlling means is configured to place said ions of relatively high mass to charge ratio, $M_2$, on trajectories having a radial apogee, $r_{apogee}$, greater than the distance, a ($r_{apogee}>a$).

3. A separator as recited in claim 1 wherein said electric field E is oriented radially with a positive potential ($V_{ctr}$) on said longitudinal axis and a substantially zero potential at said radial distance, a, from said longitudinal axis.

4. A separator as recited in claim 1 wherein said controlling means is configured to place said ions of relatively low mass to charge ratio, $M_1$, on helical trajectories of diameter $D_{low\ mass}$, and said collector has an inner radius $R_{inner}$, with $R_{inner}>D_{low\ mass}+r_{source}$.

5. A separator as recited in claim 1 wherein said establishing means comprises a plurality of ring shaped electrodes that are concentrically arranged about said axis and positioned at a said end of said wall to create said electric field (E) in said chamber.

6. A separator as recited in claim 1 wherein said establishing means comprises at least one coil mounted on said wall to create said magnetic field (B) in said chamber.

7. A device for separating a multi-constituent material into constituents, said device comprising:
    a cylindrical wall having an inner radius, $R_{wall}$, said wall surrounding a chamber and defining a longitudinal axis;
    means for converting the multi-constituent material into a multi-species plasma in said chamber within a radius, $r_{source}$, from said longitudinal axis to create ions of relatively low mass to charge ratio, $M_1$, and ions of relatively high mass to charge ratio, $M_2$;
    a collector shaped as a hollow cylinder having outer radius $R_{outer}$, said collector centered on said longitudinal axis and positioned at said second end of said wall;
    means for establishing a radial electric field (Er) and an axially aligned magnetic field ($B_z$) in said chamber to create a plasma region of radius, a, from said axis, with $a<R_{wall}$; and
    means for controlling said electric field ($E_r$) and said magnetic field ($B_z$) to place said ions of relatively high mass to charge ratio, $M_2$, on trajectories into said collector, and to place said ions of relatively low mass to charge ratio, $M_1$, on trajectories through said hollow collector.

8. A separator as recited in claim 7 wherein said controlling means establishes a cutoff mass, $M_C$, relative to a radial distance, a, from said axis in accordance with the equation:

$$M_C = zea^2(B_z)^2/8V_{ctr}$$

where "ze" is the ion charge.

9. A separator as recited in claim 8 wherein said controlling means establishes a cutoff mass, $M_C$, with $M_1<M_2\leq M_C$.

10. A separator as recited in claim 7 wherein said cylindrical wall has a first end and a second end, said converting means is positioned at said first end of said wall, and said collector is positioned at said second end of said wall.

11. A separator as recited in claim 7 wherein said radius, $r_{source}$, is sized to create a multi-species plasma having cold ions.

12. A separator as recited in claim 7 wherein said controlling means is configured to place said ions of relatively high mass to charge ratio, $M_2$, on trajectories having a radial apogee, $r_{apogee}$, with $r_{apogee}>R_{outer}$.

13. A separator as recited in claim 7 wherein said electric field, $E_r$, is established with a positive potential ($V_{ctr}$) on said longitudinal axis and a substantially zero potential at said distance, a, from said longitudinal axis.

14. A separator as recited in claim 7 wherein said converting means is configured to generate a plasma having a collisional density, $n_c$, in said plasma region.

15. A separator as recited in claim 7 wherein said converting means is configured to generate a plasma having a collision-less density in said plasma region.

16. A method for separating a multi-constituent material into constituents, said method comprising the steps of:
    providing a cylindrical wall having inner radius, $R_{wall}$, said wall surrounding a chamber and defining a longitudinal axis;
    converting the multi-constituent material into a multi-species plasma in said chamber within a radius, $r_{source}$, from said longitudinal axis to create cold ions of relatively low mass to charge ratio, $M_1$, and cold ions of relatively high mass to charge ratio, $M_2$;
    centering a hollow cylinder having an outer radius, $R_{outer}$, on said longitudinal axis;
    establishing crossed electric and magnetic fields (E×B) in said chamber to define a cutoff mass, $M_C$, relative to a radial distance, a, from said axis, with $M_1<M_2\leq M_C$ and $a<R_{wall}$; and
    controlling E×B to place said ions of relatively high mass to charge ratio, $M_2$, on trajectories having a radial apogee, $r_{apogee}$, into said cylinder with $r_{apogee}>R_{outer}$, and to place said ions of relatively low mass to charge ratio, $M_1$, on trajectories through said hollow cylinder.

17. A method as recited in claim 16 wherein said controlling step places said ions of relatively high mass to charge ratio, $M_2$, on trajectories having a radial apogee, $r_{apogee}$, greater than the radial distance, a ($r_{apogee}>a$).

18. A method as recited in claim 16 wherein said electric field, E, is oriented radially with a positive potential ($V_{ctr}$) on said longitudinal axis and a substantially zero potential at said distance, a, from said longitudinal axis.

19. A method as recited in claim 16 wherein said controlling step places said ions of relatively low mass to charge ratio, $M_1$, on helical trajectories of diameter $D_{low\ mass}$, and said collector has an inner radius $R_{inner}$, with $R_{inner}>D_{low\ mass}+r_{source}$.

20. A method as recited in claim 16 wherein said establishing step is accomplished with a plurality of ring shaped electrodes that are concentrically arranged about said axis and positioned at a said end of said wall to create said electric field (E) in said chamber.

* * * * *

UNITED STATES PATENT AND TRADEMARK OFFICE
CERTIFICATE OF CORRECTION

PATENT NO. : 6,956,217 B2
DATED : October 18, 2005
INVENTOR(S) : Tihiro Ohkawa

It is certified that error appears in the above-identified patent and that said Letters Patent is hereby corrected as shown below:

Column 2,
Line 49, delete "nc" and insert -- $n_c$ --.

Column 3,
Line 26, delete "$p_\theta = \pm [eB_z r^2/2] [1-4\alpha/\Omega]^{1/2}$" insert -- $p_\theta = \pm [eB_z r^2/2] [1-4\alpha/\Omega]^{1/2}$ --.

Column 7,
Line 31, delete "$<W\perp> = \lambda[1-\sqrt{\mu}]^2 r_s/2$" insert -- $<W\perp> = \lambda[1-\sqrt{\mu}]^2 r_s^2/2$ --.

Column 8,
Line 19, delete "nc" insert -- $n_c$ --.

Column 9,
Line 39, delete "Er" insert -- $E_r$ --.

Column 10,
Line 7, delete "Router" insert -- $R_{outer}$ --.

Signed and Sealed this

Third Day of January, 2006

JON W. DUDAS
*Director of the United States Patent and Trademark Office*